US007587507B2

(12) United States Patent
Klemets

(10) Patent No.: US 7,587,507 B2
(45) Date of Patent: Sep. 8, 2009

(54) MEDIA RECORDING FUNCTIONS IN A STREAMING MEDIA SERVER

(75) Inventor: Anders Edgar Klemets, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 682 days.

(21) Appl. No.: 11/187,740

(22) Filed: Jul. 22, 2005

(65) Prior Publication Data

US 2007/0022183 A1 Jan. 25, 2007

(51) Int. Cl.
*G06F 15/16* (2006.01)
(52) U.S. Cl. ...................................... 709/231; 709/232
(58) Field of Classification Search ................... 709/231
See application file for complete search history.

(56) References Cited

U.S. PATENT DOCUMENTS

| 6,272,566 | B1 * | 8/2001 | Craft ........................... 710/53 |
| 6,728,763 | B1 | 4/2004 | Chen |
| 6,754,715 | B1 | 6/2004 | Cannon et al. |
| 6,766,376 | B2 * | 7/2004 | Price ........................... 709/231 |
| 7,047,308 | B2 * | 5/2006 | Deshpande ................. 709/232 |
| 2001/0027468 | A1 * | 10/2001 | Okura ......................... 709/202 |
| 2004/0064576 | A1 * | 4/2004 | Goldhor et al. ............. 709/232 |
| 2004/0098748 | A1 | 5/2004 | Bo et al. |
| 2004/0226047 | A1 | 11/2004 | Lin et al. |
| 2004/0267952 | A1 * | 12/2004 | He et al. ...................... 709/231 |
| 2005/0125221 | A1 * | 6/2005 | Brown et al. ............. 704/200.1 |
| 2005/0132417 | A1 * | 6/2005 | Bobrovskiy et al. ......... 725/134 |
| 2007/0223332 | A1 * | 9/2007 | Fujinami et al. ......... 369/47.22 |

FOREIGN PATENT DOCUMENTS

WO 04090677 A2 10/2004

OTHER PUBLICATIONS

"Vital Streams", http://www.vitalstream.com/macromedia/fvsslive.html.
"Akamai Streaming", http://www.akamai.com/en/html/services/streaming.html.
Markham, "Novell Launches Internet Multimedia Caching", Nov. 10, 1999. 2 Pages. Webpage Available at: http://www.stratamp.com/novellpr/press/FY2000/November/nicsquicktime.htm.
Phifer, "Stream Caching with TeraEDGE", http://isp-planet.com/equipment/teraedge1.html.
Realnetworks Inc., "Chapter 11-Broadcasting a Presentation", Realsystem G2 Production Guide, 1998. pp. 157-162.

* cited by examiner

*Primary Examiner*—Patrice Winder
*Assistant Examiner*—Minh-Chau Nguyen

(57) ABSTRACT

A system for providing recording functions in a streaming media server comprising a streaming media server with buffering and a PC having an application capable of processing a streaming media protocol having media recording functions.

17 Claims, 5 Drawing Sheets

MEDIA RECORDING FUNCTIONS IN A STREAMING MEDIA SERVER

BACKGROUND

This description relates generally to streaming media and more specifically to streaming media buffers. Audio and video information is increasingly being sent over internet connections. Prerecorded and live broadcasts are included in the material that is transmitted over the internet. Unique problems are presented in the transmission of high bandwidth material and a number of protocols have been developed to facilitate transmission. As use of streaming media increases there may be a pressure to include more user friendly features. Features that may compete for already crowded bandwidth.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides a way to incorporate media recording features in a streaming media transmission structure. Streaming media broadcasts may utilize a buffer in a streaming media server, that may allow limited rewind and replay capabilities in a live broadcast, and limited fast forward and rewind capabilities in a prerecorded broadcast. In particular a seekable range may be incorporated in a packet structure or a header structure to communicate a seekable range to a client application. The client application may utilize the seekable range to provide a user interface that allows a user to achieve a limited rewind, or replay, capability. And in the case of a prerecorded broadcast the user may have a limited fast forward capability as well.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 1 is a block diagram showing a first example of a streaming media system including media recording functions, such as seek, fast-forward, rewind and the like.

Like reference numerals are used to designate like parts in the accompanying drawings.

DETAILED DESCRIPTION

Figure 1:
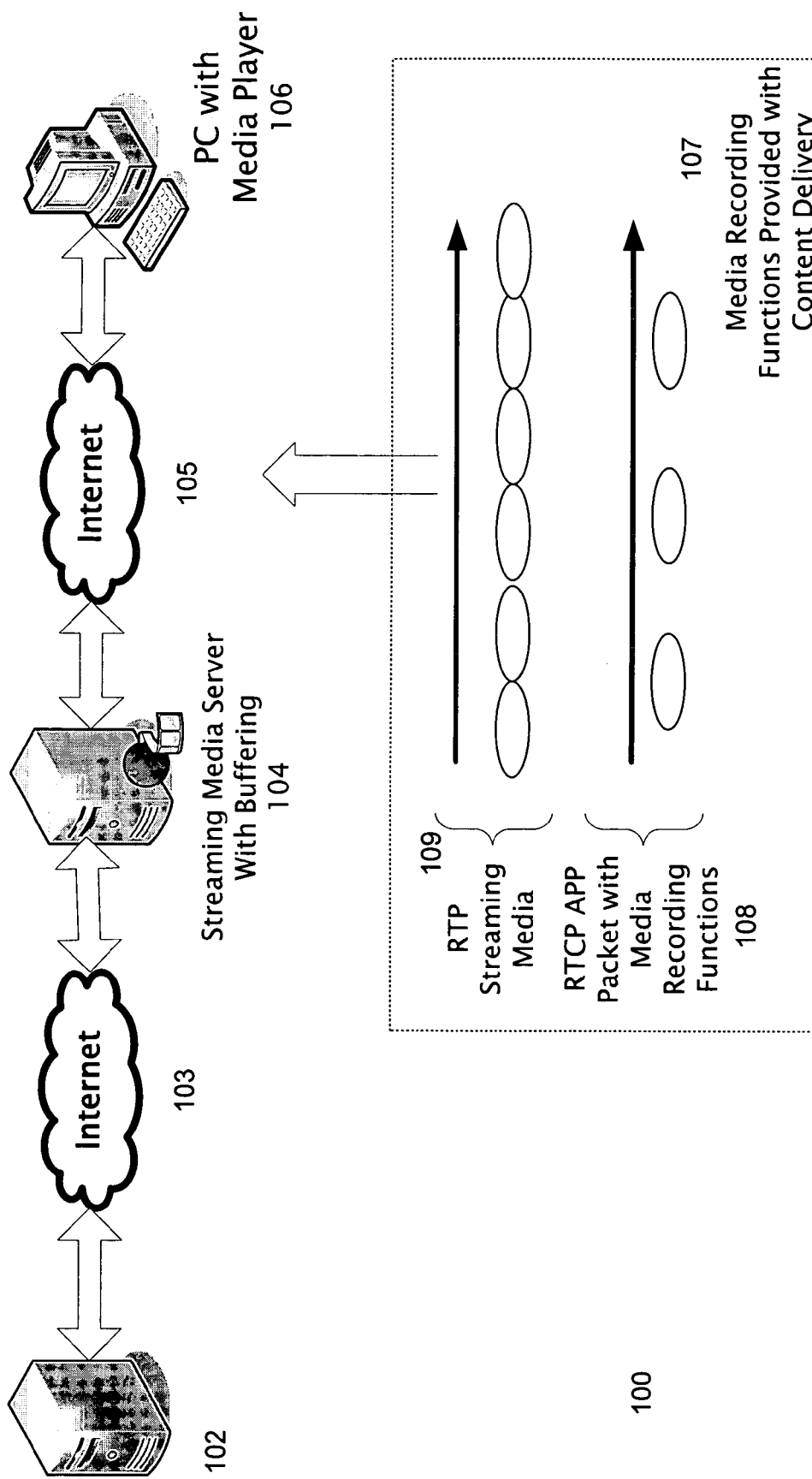

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a PC based system, the system described is provided as an example and not a limitation. As those skilled in the art will appreciate, the present examples are suitable for application in a variety of different types of media player equipped systems.

Streaming media servers typically provide two types of content: pre-recorded "on-demand" content and live "broadcast" content. In some cases the content may be pre-recorded, but the server actually streams the content as if it were live. For example, a server may be receiving pre-recorded content from a satellite feed. When the server streams that content, the content is seemingly "live" because, the sever cannot ask the satellite to seek or rewind. When a streaming media client accesses pre-recorded on-demand content, the server will usually allow the client to seek, fast-forward and rewind to arbitrary positions in the content file. However, for broadcast content, these operations are typically not supported. For broadcast situations the client is typically only able to stream the content from the point where he joins the broadcast, to the end.

A variety of protocols may be employed to stream media to a client. The HTTP protocol, RTP, RTCP, and RTSP are examples of possible protocols. Seekable ranges may be specified in a variety of ways utilizing these formats. For example a new packet type may be utilized in the RTCP format, and headers may be utilized in conjunction with RTSP to convey seekable ranges. Those skilled in the art will realize that these protocols may be part of a layered data transport structure that operates in conjunction with other data transport structures such as UDP, TCP and the like.

The first example provided of a streaming media system with forward and rewind capabilities typically allows a streaming media server to cache at least a portion of the broadcast content, thereby enabling a client to seek, fast-forward and rewind within the cached (or buffered) portion of the content.

A second example describes a new RTCP 'APP' packet which typically allows the streaming media server to specify a seekable range in the multi-media presentation. The new RTCP packets are typically pushed by the server to the client at regular intervals, thereby enabling a player to visually represent to the user the portion of the program within which it is possible to seek.

A third example allows the extension of the RTSP ANNOUNCE and OPTIONS commands in the RTSP packet structure. The extension typically allows the commands to communicate the seekable range. The three examples are presented in further detail below.

FIG. 1 is a block diagram showing a first example of a streaming media system 100 including media recording functions, such as seek, fast-forward, rewind and the like. Media recording functions provided in the examples may be implemented by modifying the packet structure typically utilized in streaming media 107, typically in conjunction with a buffer that may be present in a streaming media server 104.

A streaming media server 104 is typically coupled to the internet 105. The streaming media server 104 is typically provided with a buffer or memory that may be utilized to collect the media file, or packets that have been feed to it from the source of the media file 102. The internet 105 is in turn coupled to a PC, typically including an application program, or media player suitable for processing and displaying streaming media files 106. In an alternative example the server is connected an IP network in the home, a "home network" rather than to another server through the internet.

As previously mentioned a RTP 109 (including RTCP), or a RTSP protocol may be accompanied by other data transport layers to facilitate download of streaming media files 107. As shown in the figure the streaming media download can be viewed as a two part process in which the parts may be performed in parallel. First there is a stream of packets that are being downloaded that contain the information being transmitted 109. Second there is a channel that provides control information to the client 108. Packets in the control channel are not transmitted as frequently as the stream of packets providing content. As shown here the RTCP application packet 108 transmitted has been modified to convey a seekable range from the streaming media server to the client. And, as shown the packets travel in approximately parallel order.

Figure 2:
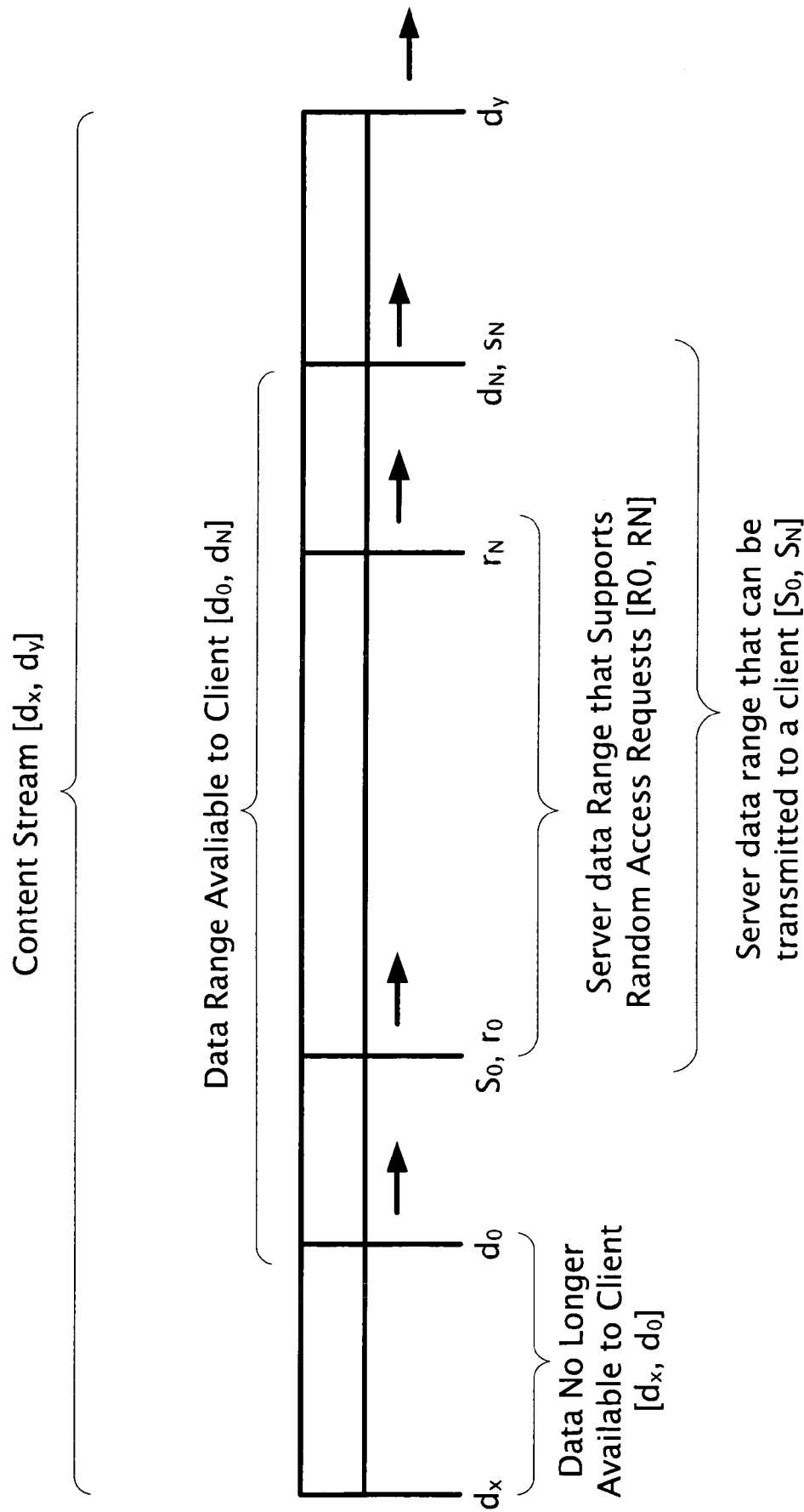
FIG. 2 is a diagram showing seekable range parameters in streaming media.

FIG. 2 is a diagram showing seekable range parameters in streaming media. The entire content stream is designated by the interval identifiers $[d_x, d_y]$. The identifier dy shows the duration, and may change with time. A pair of data ranges may be present. The server data range that can be transmitted to the client is denoted $[S_0, S_n]$. The server data range that supports random access request may be identified as being between $[r_0, r_n]$. As the buffer fills and empties over time the data range available to the client may change over time and is denoted $[d_0, d_n]$. If the presentation has progressed so that information has passed through the buffer and is no longer available to a client application this interval is denoted by $[d_x, d_0]$. And data not yet available to the client may be designated by the interval $[d_N, d_y]$. The information above may be used to convey a seekable range in the media file being transmitted.

Typically RTCP packets conveying the above described seekable range information are sent automatically and periodically. In one approach it may be best not to change $R_0$ so often. An RTCP packet only needs to be sent when the searchable, or seekable, range changes. However, RTCP packets are sent regularly so including additional information in that packet does not typically burden system resources.

In some situations information about the seekable range can be queried from the server, as a complement to the automatic updates.

Figure 3:
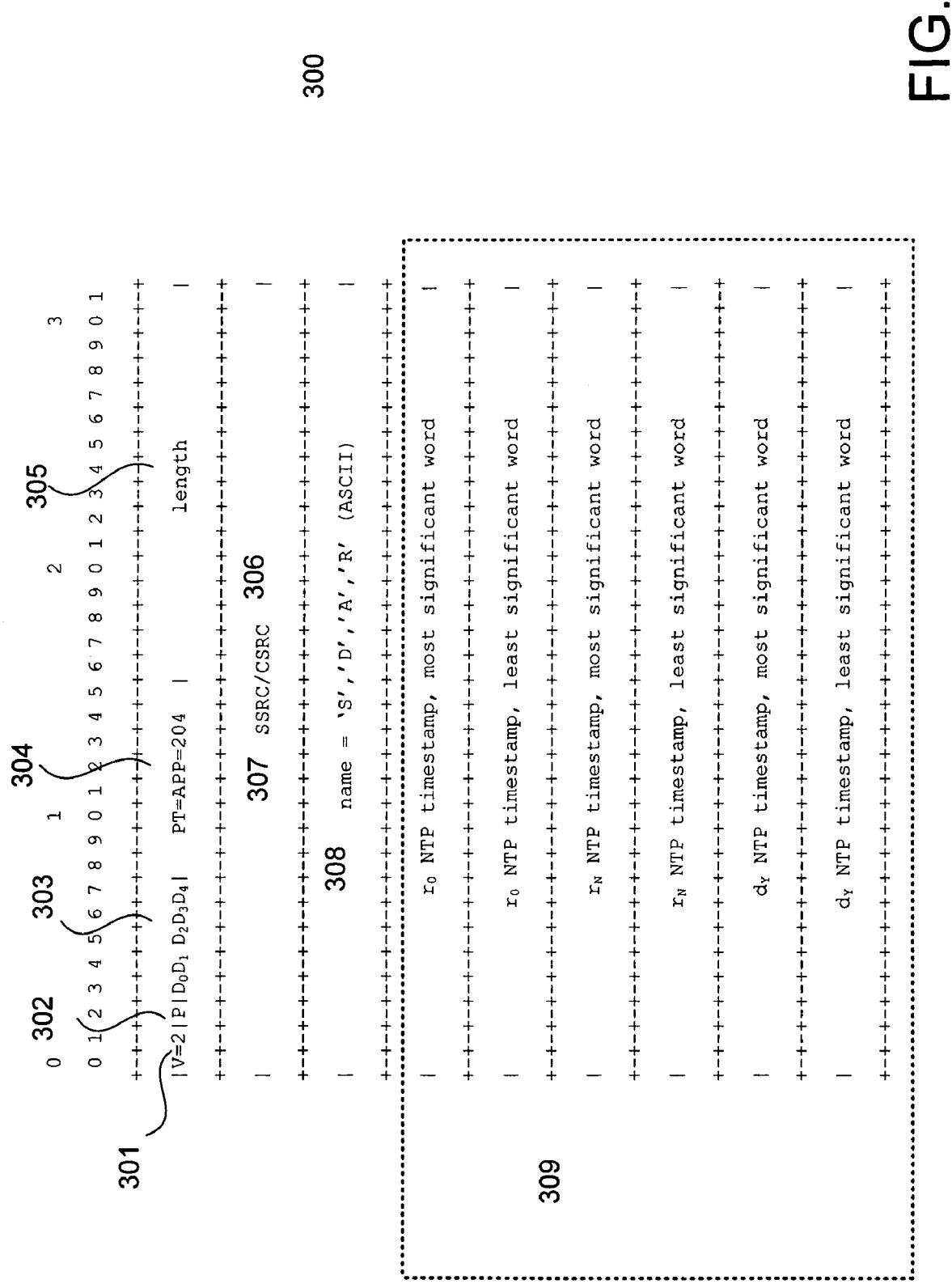
FIG. 3 is a block diagram showing a second example of an extension of an RTCP packet format allowing a seekable range to be communicated between a media server and media player.

FIG. 3 is a block diagram showing a second example of an extension of an RTCP packet format allowing a seekable range to be communicated between a media server and media player 300. RTCP is a protocol typically used for streaming media applications. Another related protocol for transmitting streaming media is the real time protocol ("RTP"). Real time streaming protocol ("RTSP") is a related protocol, typically used in conjunction with the RTCP and RTSP protocols. RTCP is the companion protocol to RTP, which is defined in IETF RFC-3550. The present figure shows how an APP packet in the RTCP protocol may be modified to transmit seekable range. As will be described below the header structure that is available in the RTSP protocol can also be sent to communicate the seekable range.

Real Time Protocol ("RTP") is the IETF Internet Standard for conveying media streams between interactive participants, and between streaming media servers and streaming media clients. Audio or video data is sent in small chunks. Each chunk of data is preceded by an RTP header. The RTP header indicates what type of audio encoding (such as PCM, ADPCM or LPC) is contained in each packet, among other things such as a time stamp and a sequence number.

RTP is augmented by a control protocol (RTCP) that allows monitoring of the data delivery in a manner scalable to large multicast networks, and to provide minimal control and identification functionality.

A streaming media server is typically coupled to a client. Here a client is an application such as a media player application program that may process streaming media content. Typically the client establishes a connection with the streaming media server and makes a request to the server to download content. Typically the content is downloaded in a format governed by various protocols, such as RTP as mentioned above.

Typical streaming media servers provide two types of content: pre-recorded content (also called on-demand content), and live (also called broadcast) content. When a streaming media client accesses on-demand content, the server will usually allow the client to seek, fast-forward and rewind to arbitrary positions in the content file. For broadcast content, however, none of these operations are supported, and the client is only able to stream the content from the point where he joined the broadcast, to the end.

This second example utilizes a streaming media server including a buffer, or service buffer. The streaming media server is recording (or buffering) at least a portion of the broadcast content that it ultimately sends out. Such a streaming media server with buffering can allow the client to seek, fast-forward and rewind within the portion of the content that is contained in the buffer. Alternatively the server may just send out the content as soon as it receives it. In this case the buffer is initially empty but then grows until it reaches its maximum size. For example, as the server sends out each packet, it stores a copy of the packet in the buffer, causing the buffer to grow from 0 to the max size.

Existing streaming media protocols, such as RTSP, do not allow for this mode of operation. As currently implemented they typically do not define a way by which the server can inform the client about how much of the streaming media content has been cached in the buffer.

The second example provides an extension to the RTCP protocol, which allows a streaming media server to communicate the seekable range (the start and stop times) of the buffered content to a media player application. This communication may allow a client application, such as a media player to provide a user interface to the user. The user interface may visually represent to the user, using a horizontal bar or other similar indicator, the part of the program in which it is possible to seek a different portion of the content.

The second example of an extension of an RTCP packet format allows a seekable range to be communicated between a media server and media player. It allows the media server to communicate to a media player application the seekable range. A new RTCP 'APP' packet 300 allows the server to specify the seekable range in a multi-media presentation.

RTP is an Internet-standard protocol for the transport of real-time data, including audio and video. It can be used for media-on-demand as well as interactive services such as Internet telephony, and for streaming of live ("broadcast") content. RTP includes a data portion and a control part called RTCP.

Real-time Transport Protocol, or RTP, typically provides services for the transport of real-time data, such as audio and video. Those services may include payload type identification, sequence numbering, time-stamping, and source identification.

Real-time Transport Control Protocol, or RTCP, is the control part of RTP. It monitors the quality of data transmission. It also may keep track of participants in a session and distributes information about participants in a session.

There are at least five types of RTCP packets which carry control information. In the Receiver Report (RR) packet participants that are not active senders generate this type of packet. RR packets contain reception quality feedback about data delivery, including the highest packets number received, the number of packets lost, inter-arrival jitter, and timestamps to calculate the round-trip delay between the sender and the receiver. In the Sender Report (SR) packet active senders generate this type of packet. In addition to the reception quality feedback, they contain a sender information section, providing information on inter-media synchronization, cumulative packet counters, and number of bytes sent. In the Source Description Items (SDES) packet these packets contain information to describe the sources. In the BYE packet this packet indicates the end of participation. In the Application defined RTCP packet ("APP") this packet is intended for experimental use as new applications and features are being developed.

Server Data Availability Report Packets ("SDAR APP packets") 300 should be combined with the RTCP SR packets for at least one of the streams. If the content is streamed as separate elementary streams, it is sufficient to include to SDAR APP packets in the RTCP SR's for only one of the streams.

In the example shown the fields of the RTC APP packet may include the fields described as follows: RTP version number ("V") 301 is two bits in length and is typically set to 2.

The padding ("P") 302 is typically 1 bit in length. If set, this packet contains one or more additional padding bytes at the end which are not part of the payload. The last byte of the padding contains a count of how many padding bytes should be ignored. Padding may be needed by some encryption algorithms with fixed block sizes or for carrying several RTP packets in a lower-layer protocol data unit.

The count ("D0 D1 D2 D3 D4") 303 is typically 5 bits. The count is typically the number of reception report blocks contained in this packet. The "subtype" field is divided into 5 single-bit fields, labeled D0 through D4. D0 is the bit in the "subtype" field which is transmitted first. D0 indicates if the dY field is present. D1-D4 are reserved for future use and are typically set to 0.

The payload type ("PT") field 304 for RTCP APP packets is set to 204. It typically can't be redefined dynamically The length 305 is typically 16 bits. The length of this RTCP packet in 32 bit words minus one, including the header and any padding. The offset of one makes zero a valid length and avoids a possible infinite loop in scanning a compound RTCP packet, while counting 32 bit words avoids a validity check for a multiple of 4.

The field 306 ("SSRC/CSRC") is typically 32 bits in length. The field contains a single 32-bit identifier that identifies the source (i.e. audio or video stream) that the information in the APP packet pertains to. The field is so named because if the APP packet is created by the sender of the APP packet, it is a SSRC, but if the sender is forwarding an APP packet on behalf of another source, it is a CSRC, i.e., the SSRC of that other source.

The synchronization source ("SSRC") 307 identifies the source of a stream of RTP packets, identified by a 32-bit numeric SSRC identifier carried in the RTP header so as not to be dependent upon the network address. The SSRC identifier is a randomly chosen value meant to be globally unique within a particular RTP session. The value is chosen randomly, with the intent that no two synchronization sources within the same RTP session will have the same SSRC. Although the probability of multiple sources choosing the same identifier is low, all RTP implementations must be prepared to detect and resolve collisions.

The "name" field 308 is typically-set to the characters 'S', 'D', 'A', 'R', to identify the APP packet as a Server Data Availability report.

The "application-dependent data" portion of the APP packet 309 consists of the following fields: r0: the start time in the seekable range; rN: the end time in the seekable range; dY: the end time of the current content. This field is only present if D0 is 1.

In an example the times are expressed as 64-bit NTP-format time stamps, and use the same time scale as is used in the RTSP "Range" header and the SDP "a=range" attribute.

The fields use specific nomenclature, for example, the seekable range is called $[r_0, r_N]$. The examples are designed for servers that may use the RTSP/RTP/RTCP protocol suite. And the new RTCP packets are pushed by the server to the client at regular intervals. This may happen in conjunction with the server's sending of RTCP Sender Report packets to the client. In alternative examples the client may poll the server. However, having the client poll the server tends to be less efficient, because it tends to involve a request-response exchange over the RTSP connection between the streaming media server and the media player.

In addition to communicating the seekable range, the new RTCP packet extension also specifies the end-time of the multi-media presentation. This is useful if the end-time was not previously known, or if it is changing. Knowing this information will allow the client application to scale the "seek bar" in the user interface. Scaling the seek bar should give the user a better visual representation of where he is currently playing in the multi-media presentation.

A third and fourth example provide extensions of the RTSP ANNOUNCE and OPTIONS commands in the RTSP packet structure that allow a seekable range to be communicated. Here communication of the seekable range is accomplished with RTSP headers. In the third example of the ANNOUNCE command the server sends this command to the client Typically the client will send a response back to the server, that may tend to consume computer resources on the server. This is unlike the RTCP packet extension of the second example that can include the seek time information in a packet that will be sent anyway. Here the client typically must respond to the ANNOUNCE command further consuming server system resources.

In the fourth example of the OPTIONS request being used to convey seek time information the request is initiated by the client, and the RTSP headers that convey information about the seakable range are added by the server in its response to the OPTIONS request.

Figure 4:
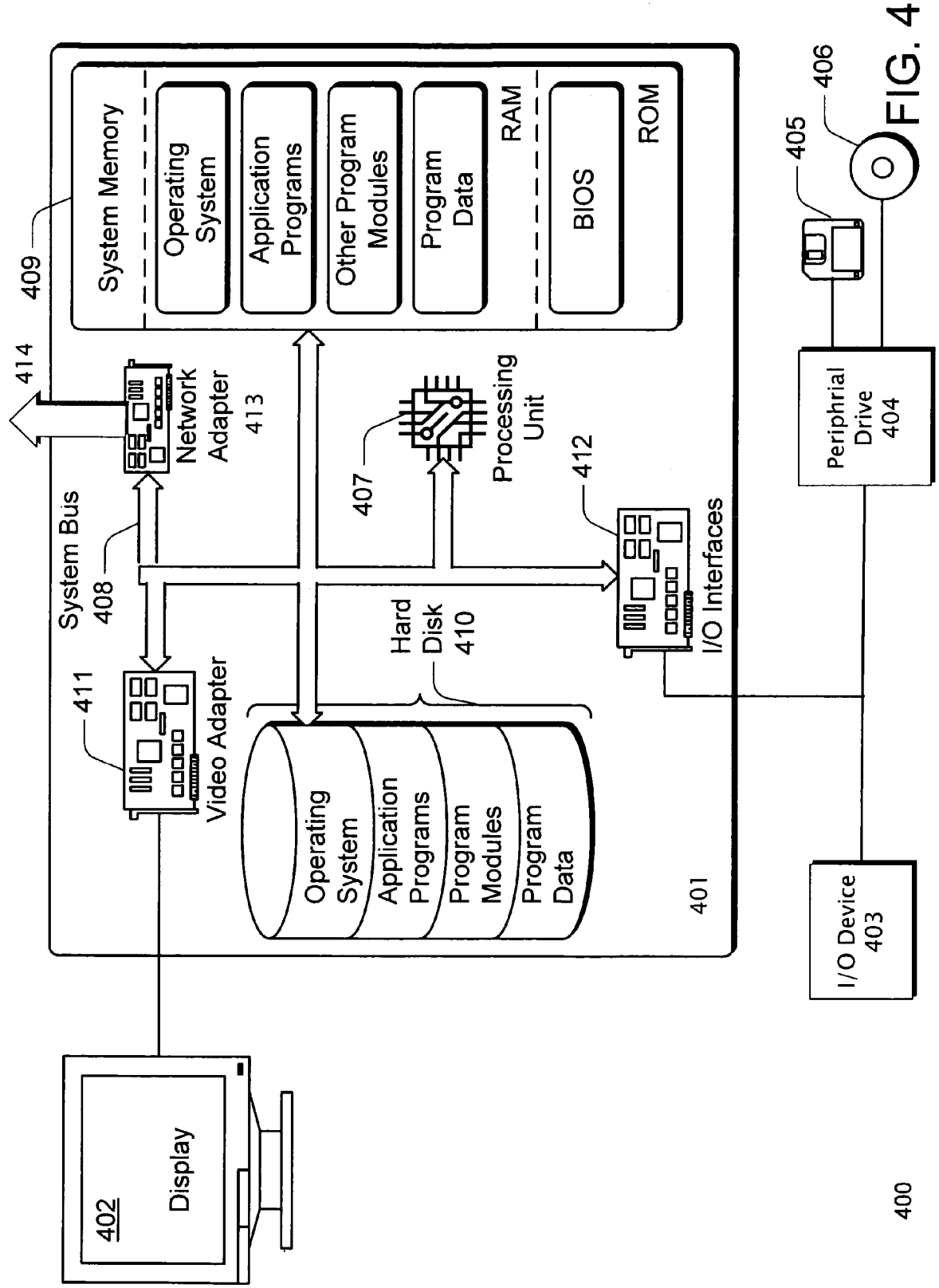
FIG. 4 illustrates an exemplary computing environment in which the media recording functions described in this application, may be implemented.

FIG. 4 illustrates an exemplary computing environment 400 in which the media recording functions described in this application, may be implemented. Exemplary computing environment 400 is only one example of a computing system and is not intended to limit the examples described in this application to this particular computing environment.

For example the computing environment 400 can be implemented with numerous other general purpose or special purpose computing system configurations. Examples of well known computing systems, may include, but are not limited to, personal computers, hand-held or laptop devices, microprocessor-based systems, multiprocessor systems, set top boxes, gaming consoles, consumer electronics, cellular telephones, PDAs, and the like.

The computer 400 includes a general-purpose computing system in the form of a computing device 401. The components of computing device 401 can include one or more processors (including CPUs, GPUs, microprocessors and the like) 407, a system memory 409, and a system bus 408 that couples the various system components. Processor 407 processes various computer executable instructions, including those to implement a seekable range to control the operation of computing device 401 and to communicate with other electronic and computing devices (not shown). The system bus 408 represents any number of several types of bus structures, including a memory bus or memory controller, a peripheral bus, an accelerated graphics port, and a processor or local bus using any of a variety of bus architectures.

The system memory 409 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 407.

Mass storage devices 404 may be coupled to the computing device 401 or incorporated into the computing device by coupling to the buss. Such mass storage devices 404 may include a magnetic disk drive which reads from and writes to a removable, non volatile magnetic disk (e.g., a "floppy disk") 405, or an optical disk drive that reads from and/or writes to a removable, non-volatile optical disk such as a CD ROM or the like 406. Computer readable media 405, 406 typically embody computer readable instructions, data structures, program modules and the like supplied on floppy disks, CDs, portable memory sticks and the like.

Any number of program modules can be stored on the hard disk 410, mass storage device 404, ROM and/or RAM 4-9, including by way of example, an operating system, one or more application programs, other program modules, and program data. Each of such operating system, application programs, other program modules and program data (or some combination thereof) may include an embodiment of the systems and methods described herein.

A display device 402 can be connected to the system bus 408 via an interface, such as a video adapter 411. A user can interface with computing device 702 via any number of different input devices 403 such as a keyboard, pointing device, joystick, game pad, serial port, and/or the like. These and other input devices are connected to the processors 407 via input/output interfaces 412 that are coupled to the system bus 408, but may be connected by other interface and bus structures, such as a parallel port, game port, and/or a universal serial bus (USB).

Computing device 400 can operate in a networked environment using connections to one or more remote computers through one or more local area networks (LANs), wide area networks (WANs) and the like. The computing device 401 is connected to a network 414 via a network adapter 413 or alternatively by a modem, DSL, ISDN interface or the like.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Figure 5:
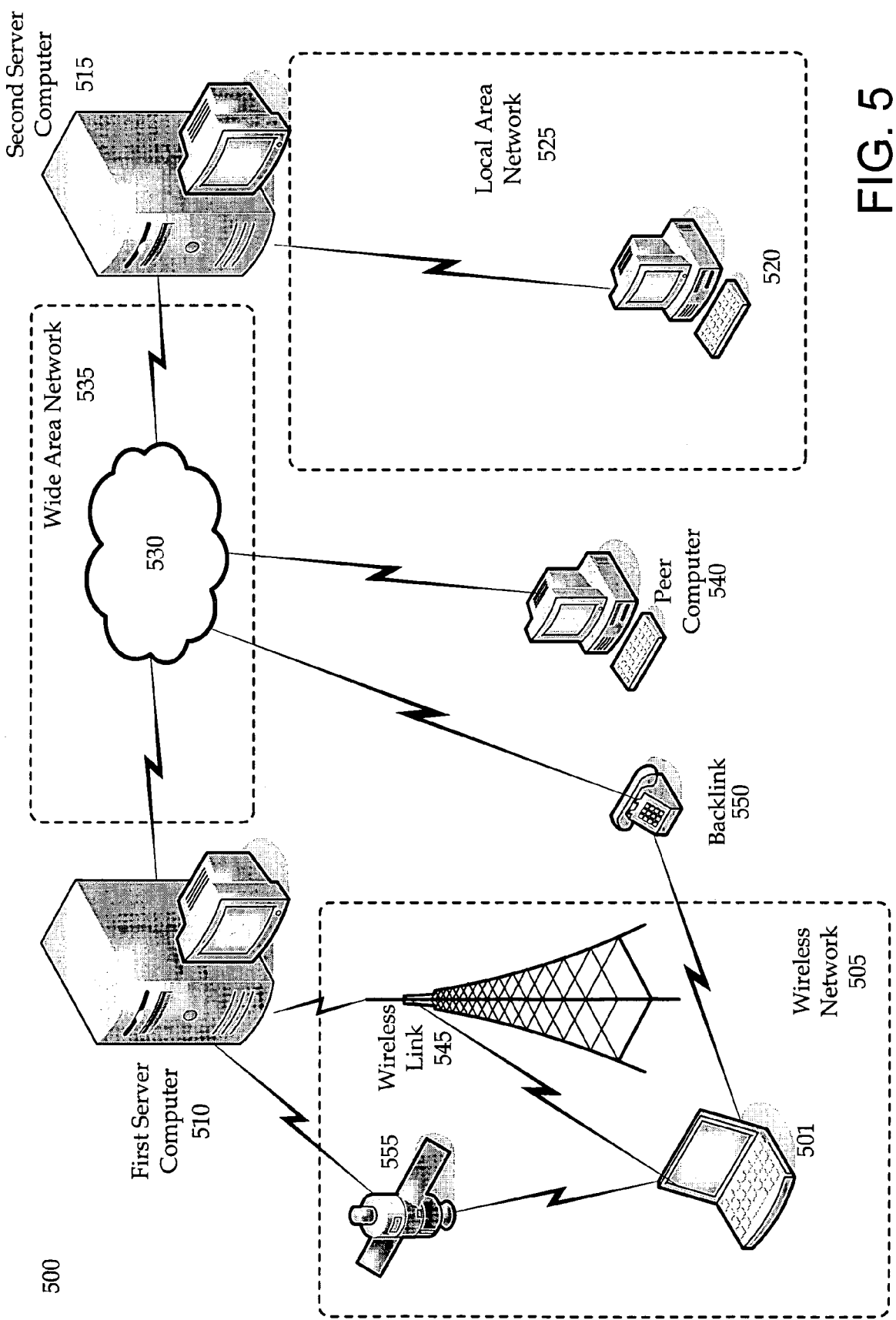
FIG. 5 is an exemplary network 500 that may be utilized by the above examples.

FIG. 5 is an exemplary network 500 that may be utilized by the above examples. Computer 515 is a server computer coupled to a user's computer 520 through a conventionally constructed local area network 525.

In the local area network the users computer is typically part of the local area network 525 which may include a plurality conventional computers (not shown) and conventional peripheral equipment (not shown) coupled together utilizing topologies (token, star and the like) and switching equipment known to those skilled in the art. Those skilled in the art will realize that other processor equipped devices such as televisions and VCRs with electronic program guides, cellular telephones, appliances and the like may be coupled to the internet utilizing conventional techniques known to those skilled in the art.

A typical local area network 525 may include a conventionally constructed ISP network in which a number or plurality of subscribers utilize telephone dial up, ISDN, DSL, cellular telephone, cable modem, or the like connections to couple their computer to one or more server computers 515 that provide a connection to the world wide web 535 via the internet 530.

Wide area network or world wide web 535 is conventionally constructed and may include the internet 530 or equivalent coupling methods for providing a wide area network. As shown a conventionally constructed first server computer 510 is coupled to conventionally constructed second server computer 515 through a conventionally constructed internet connection to the world wide web 530.

In a peer to peer network a Peer computer 540 is conventionally constructed to couple to the internet 53 utilizing peer to peer network technology. Peer computer 540 may couple to a plurality of similarly connected peer computers in a peer to peer network (not shown), or to other computers 501, 520 that are part of conventionally constructed networks 525, 535.

In a conventional wireless network 505 a conventionally constructed computer 501 is coupled to the internet 530 via a conventionally constructed wireless link 545. The wireless link may include cellular, and satellite technology 555 to provide the link. Such a wireless network may include a conventionally constructed first server computer 510, typically provided to manage connections to a wide area network such as the internet. Those skilled in the art will realize that the computer 501 may be embodied as a processor coupled to the electronics of an automobile, and referred to as an automotive processor. Such a processor coupled to the internet may be used to find directions, report trouble or communicate with global positioning systems to determine position.

A conventionally constructed back link may be provided to efficiently provide an additional channel to couple to the internet. For example in situations where communication is one way in nature, the back link may provide communications in the opposite direction. An example would be viewing a listing of available on demand movies and ordering a selection via telephone 540. Those skilled in the art will realize that back links may equivalently be provided by cellular telephones, cordless telephones, paging devices and the like.

The invention claimed is:

1. A method of streaming media comprising:
buffering a streaming media signal in a streaming media server to form a buffered streaming media signal;
streaming the buffered streaming media signal from the streaming media server to a computer, one or more portions of the streaming media signal being buffered in a buffer in coordination with streaming the one or more portions of the streaming media signal, the buffer being a first-in first-out buffer having a capacity of less than the total size of the streaming media signal, the buffer storing the seekable range of the streaming media signal at the streaming media server, and
transmitting an RTCP APP packet containing media recording functions to the computer, wherein when the addition of a new portion of the streaming media signal to the buffer causes a first portion of the streaming media signal to be removed from the buffer, the media recording functions indicate the first portion is no longer available for retransmission from the streaming media server.

2. The method of streaming media of claim 1 further comprising:
processing the RTCP App Packet to extract the media recording functions; and
communicating the extracted media recording functions to a media player disposed on the computer.

3. The method of streaming media of claim 2 in which the media player displays a graphical user interface of the recording functions.

4. The method of streaming media of claim 3 in which the graphical user interface is a seek bar representing adjustment of a seekable range indicated by the RTCP APP packet.

5. A system for providing recording functions in a streaming media server comprising:
a streaming media server with buffering; and
a processor having an application capable of processing a streaming media protocol having media recording functions,
wherein the streaming media server is configured to store one or more portions of a media stream in a buffer in coordination with transmitting the one or more portions of the media stream, wherein the buffer is a first-in first-out buffer having a capacity of less than the total size of the media stream, wherein the streaming media server is configured to transmit media recording functions information, the media recording functions information indicating which of the one or more portions of the media stream are stored in the buffer and available for retransmission by the streaming media server upon a request,
wherein when the first-in first-out buffer is full and a new portion of the media stream is added to the first-in first-out buffer, a first portion of the media stream is removed from the first-in first-out buffer and a first media recording functions information is transmitted from the streaming media server, the first media recording functions information indicating that the first portion is no longer available for retransmission by the streaming media server.

6. The system for providing recording functions in a streaming media server of claim 5 in which the streaming media protocol having media recording functions is provided by an RTSP header.

7. The system for providing recording functions in a streaming media server of claim 6 in which the RTSP header is part of an RTSP ANNOUNCE command sent by the server to the client.

8. The system for providing recording functions in a streaming media server of claim 6 in which the RTSP header is part of the streaming media server's response an RTSP OPTIONS command.

9. The system for providing recording functions in a streaming media server of claim 5 in which the media recording function is a seekable range.

10. The system for providing recording functions in a streaming media server of claim 9 in which the seekable range is based upon a buffer capacity of a buffer of the streaming media server with buffering.

11. The system for providing recording functions in a streaming media server of claim 5 in which the application capable of processing a streaming media protocol having media recording functions is a media player.

12. The system for providing recording functions in a streaming media server of claim 11 in which the media player provides a user interface for adjusting a seekable range.

13. The system for providing recording functions in a streaming media server of claim 5 in which the streaming media protocol having media recording functions is provided by RTP and an RTCP APP packet including media recording functions.

14. A computer-readable media storing computer-executable code that when executed by a processor causes a computer to store a packetized data signal structure, the computer executable code comprising:
computer-executable code configured to cause a computer to store a name field identifying the packet as an application packet; and
computer-executable code configured to cause a computer to store an application dependent portion of the application packet providing seekable range information, the seekable range information indicating a seekable range within a media stream available upon a request to a streaming media server, the streaming media server being configured to store one or more portions of the media stream in a buffer in coordination with transmitting the one or more portions of the media stream, the buffer being a first-in first-out buffer having a capacity of less than the total size of the media stream, the buffer storing the seekable range of the media stream,
wherein when the addition of a new portion of the media stream to the buffer causes a first portion of the media stream to be removed from the buffer, the seekable range information indicates the first portion is no longer available for retransmission from the streaming media server.

15. The computer-readable media of claim 14 in which the application packet is compatible with an RTCP transmission standard.

16. The computer-readable media of claim 14 wherein the streaming media server includes a buffer and wherein the seekable range information is determined by a buffer size of the buffer.

17. The computer-readable media of claim 14 in which the seekable range information provides a limited rewind function.

* * * * *